United States Patent [19]

Kozlowski, II

[11] Patent Number: 5,230,807
[45] Date of Patent: Jul. 27, 1993

[54] ELECTRICAL WATER TREATMENT SYSTEM WITH INDICATORS DISPLAYING WHETHER CONTROL LIMITS ARE MAINTAINED

[75] Inventor: Jerome J. Kozlowski, II, Mount Clemens, Mich.

[73] Assignees: Miriam Peterson; Dale E. Schotts, Plymouth, Mich.

[21] Appl. No.: 861,259

[22] Filed: Mar. 31, 1992

[51] Int. Cl.⁵ .......................................... B01D 43/00
[52] U.S. Cl. .................................... 210/696; 204/186; 204/302; 210/94; 210/243; 210/748
[58] Field of Search ................. 210/85, 143, 243, 696, 210/746, 748, 94; 204/149, 186, 302, 305, 188, 191; 55/2, 104, 105, 274

[56] References Cited

U.S. PATENT DOCUMENTS

| | | | |
|---|---|---|---|
| 3,758,399 | 9/1973 | Pendergrass | 204/275 |
| 3,843,507 | 10/1974 | Kwan | 204/302 |
| 4,151,090 | 4/1979 | Brigante | 210/243 |
| 4,326,954 | 4/1982 | Shroyer | 210/748 |
| 4,917,782 | 4/1990 | Davies | 210/748 |
| 4,961,845 | 10/1990 | Dawson et al. | 210/243 |
| 4,963,268 | 10/1990 | Morse | 210/85 |
| 5,089,145 | 2/1992 | Fern | 210/748 |
| 5,171,431 | 12/1992 | Schulte | 210/243 |

FOREIGN PATENT DOCUMENTS 3805249  8/1989  Fed. Rep. of Germany ........ 210/85

Primary Examiner—Joseph W. Drodge
Attorney, Agent, or Firm—Harness, Dickey & Pierce

[57] ABSTRACT

A method and apparatus for electronically treating water flowing through a water distribution system is disclosed which functions to inhibit the formation of scale deposits. The apparatus includes a fluid chamber connected into the water distribution system for isolating a quantity of water and an electrode in contact with the isolated water for imparting an electrical pulse train to the isolated water. The apparatus also includes a signal generation circuit for generating and regulating the pulse train and an error indicating circuit to verify proper operation of the system and to indicate the need for maintenance.

9 Claims, 6 Drawing Sheets

ELECTRICAL WATER TREATMENT SYSTEM WITH INDICATORS DISPLAYING WHETHER CONTROL LIMITS ARE MAINTAINED

BACKGROUND OF THE INVENTION

The present invention is generally directed toward preventing the buildup of mineral deposits in water distribution systems. More particularly, the present invention is directed to a method and an apparatus for neutralizing the attractive forces or "polarity" of the minerals carried in the water with respect to the distribution system. In this manner, the minerals stay in suspension rather than adhere to the flow carrying components of the distribution system.

It is known in the water treatment industry that various naturally occurring minerals and/or compounds are "suspended" in the water travelling through a water distribution system. Therefore, conditioning of the water used for industrial and domestic purposes is an important consideration in most water distribution systems. Left untreated, the minerals and compounds eventually conglomerate as a deposit of heterogeneous material on the interior metallic surfaces of the flow carrying components (i.e., pipes, valves, etc.) associated with the water distribution system. The resulting buildup or deposit of material is commonly referred to as "scale". The formation of scale poses a significant maintenance problem for water distribution systems, since scale effectively reduces the interior diameter of the pipes. In addition, the buildup of scale deposits in actuation devices, such as filters and flow control valves, can prevent such devices from functioning properly and/or detrimentally reduce their anticipated service life.

To minimize the formation of scale deposits, it is widely accepted that the minerals and/or compounds must be retained in suspension whereby such minerals and/or components pass harmlessly through the pipes and equipment of the water distribution system. While several different alternative methods for inhibiting the formation of scale are known, most have not met with universal success. For example, it is common to add chemicals to the water in an attempt to inhibit the mineral conglomeration process (i.e., "soften" the water). However, chemical additives do not necessarily prevent all forms of scale and may also produce undesirable by-products in the water. Furthermore, the use of chemical additives is generally prohibitive due to excessive costs and storage requirements.

As an alternative solution, various electronic scale control or "de-scaler" systems have been proposed for electrically conditioning the water. For example, U.S. Pat. No. 3,758,399 discloses an apparatus for imparting an electrical pulse into the water in order to inhibit the formation of scale deposits. More specifically, it has been shown that the train of electrical pulses acts to inhibit the attractive ionic bonding of the suspended mineral particles and/or compounds. While concomitantly acting to erode or dissolve previously encrusted mineral deposits. Furthermore, such electronic scale control systems do not create any undesirable by-products as a side effect of their operation, giving them a distinct advantage over utilization of chemical additives.

However, in order for such electronic pulse imparting systems to effectively inhibit the formation of scale deposits, it is of critical importance to insure that the electrical pulse train is continuously triggered at a regulated frequency. In addition, it is also critical that the imparted electrical pulse have the proper wave-form and energy to effectively neutralize the conglomeration process as well as to attack the crystalline structure of previously existing scale deposits.

SUMMARY OF THE INVENTION

It is therefore a primary object of the present invention to provide an improved electronically controlled water treatment system that is operable for inhibiting the conglomeration of minerals and compounds as scale deposits in water distribution system by regulating and monitoring the electrical pulse imparted into the water. As a related object, the present invention provides means for effectively reducing the formation of scale deposits while eventually eliminating most previously existing scale deposits in a cost effective manner. It is yet another object of the present invention to provide a water treatment system that is capable of operating within predetermined control limits and which includes means for generating an error notification signal in the event that operation of the system falls outside of the predetermined control limits.

In accordance with a preferred embodiment of the present invention, the improved electronically controlled water treatment system is operable to electrically "excite" the minerals and/or compounds suspended in the water so as to prevent their conglomeration and eventual bonding to the interior metallic surfaces of the water distribution system. The treatment system includes signal generation circuitry for generating and regulating the proper pulse and error indication circuitry for detecting when the system is inoperable or operating outside of its predetermined control limits and to generate an error signal under such conditions.

BRIEF DESCRIPTION OF THE DRAWINGS

These and other objects, features and advantages of the present invention will become more apparent to those skilled in the art by reference to the following written description and drawings in which.

DETAILED DESCRIPTION OF A PREFERRED EMBODIMENT

Figure 1:
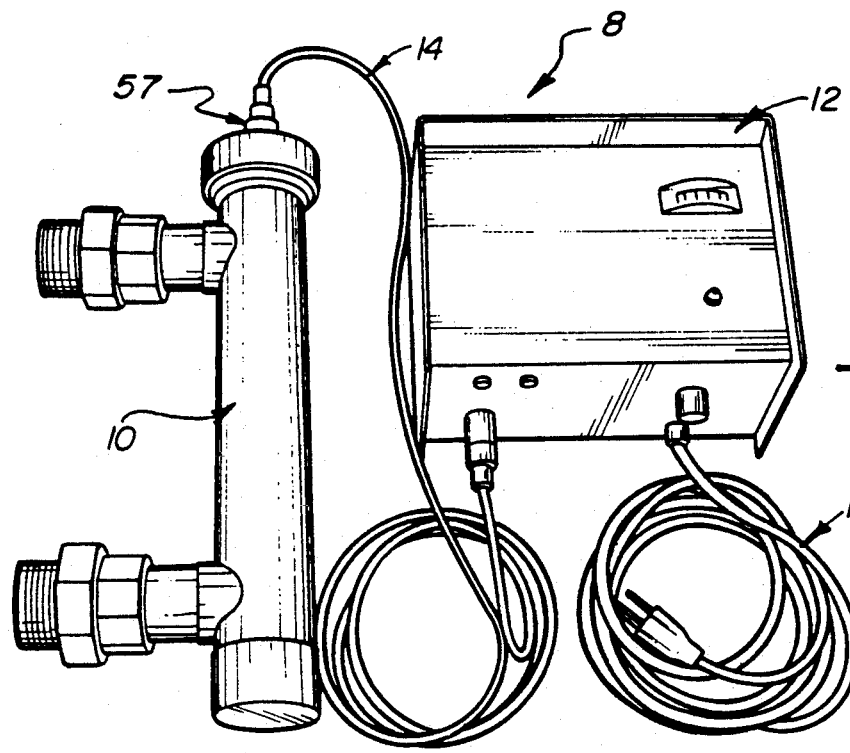
FIG. 1 is an overall pictorial view of the electronically controlled water treatment system of the present invention.

In general, the present invention is directed to an electronically controlled water treatment system 8 which is operable for eliminating and/or reducing the formation and deposition of scale in a water circulation or distribution system. For purposes of clarity, the formation of scale deposits in a water system is a conglomeration of clustered heterogeneous materials (i.e., a mass of dissimilar elements or ingredients). More particularly, operation of the present invention is based on the fact that virtually all waterborne particles have an electrical charge (i.e., positive or negative). These waterborne particles are not dissolved solids, but are held in suspension and form the nucleus around which precipitating solids unite to form scale. Generally, these small undissolved particles are referred to as colloids. Also in the water are ions of disassociated and dissolved solids such as magnesium, calcium, sodium and other naturally occurring elements. Colloids gain their electrical charge by the adsorption of ions from the surrounding water. As such, the charged colloids become the nuclei for ions of opposite charges which then conglomerate and settle out as scale. Accordingly, the present invention is directed to generating and imparting a pulse train into the water having an alternating positive and negative charge and a predetermined magnitude. In this manner, the charged colloids are effectively neutralized. Therefore, the ions (i.e., the dissolved solids) have no nuclei to cling to and, as such, are retained in suspension.

The present invention is well-suited for installation into a plethora of water treatment systems, such as cooling towers, boilers, heat exchangers and compressors. Functionally, the present invention is operable to disturb the polarity or "attractive" forces between the minerals suspended in the water which typically result in the formation of scale deposits within the water carrying components (i.e., water pipes, valves, etc.) of the water distribution system. In particular, the polarity of the minerals is effectively "neutralized" with respect to the polarity of the water carrying pipes and equipment so as to inhibit the conglomeration and deposition of scale therein.

Furthermore, the separation of the pre-existing conglomerates also requires that the attractive forces therebetween be neutralized. By neutralizing the particles, the crystalline structure of the conglomerate is effectively eroded. Accordingly, the mineral particles, broken down by the external electrical field supplied by the present invention, will remain suspended in the water and will be carried along with the water flow and pass harmlessly through the pipes and equipment. In this manner, the service life of flow controlling equipment and valves, as well as the flow capacity and integrity of the water carrying pipes, are dramatically increased with a concomitant reduction in maintenance related operation. Furthermore, increased water flow and improved heat transfer properties are additional advantages of the present invention over unprotected water systems.

Figure 2:
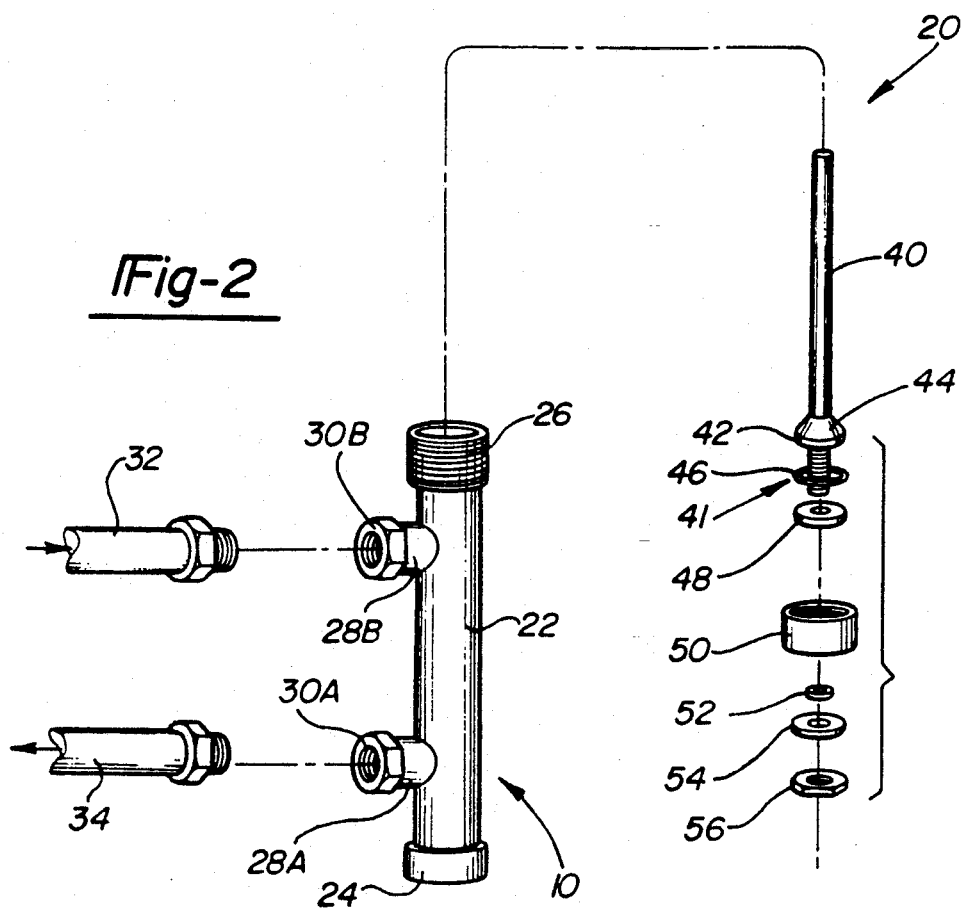
FIG. 2 is an exploded view illustrating the pulse imparting components of the system shown in FIG. 1.

With particular reference now to FIGS. 1 and 2, apparatus 8 is shown to include an isolation chamber or water cell 10 through which the water circulates, an electrode assembly 20 located inside chamber 10 which imparts the electrical pulse signal to the water, and the signal generation and error indication circuitry enclosed in a control unit 12. An output cable 14 is provided for electrically connecting electrode assembly 20 to the electronic circuitry housed within control unit 12. Power is supplied to the circuitry via a power cable 16, which can be connected to any convenient source of AC power such as 110 volt, 60 Hz or 220 volt, 50 Hz.

As clearly shown in FIG. 2, isolation chamber 10 and electrode assembly 20 are constructed and arranged to isolate and electrically "energize" the water flowing through the water distributer system and that is in fluid communication with isolation chamber 10. In accordance with an exemplary construction, isolation chamber 10 is fabricated from a stainless steel pipe 22 having a first end hermetically sealed with an end cap 24 and a second end fitted with a threaded union 26 to which electrode assembly 20 is fitted. Chamber 10 is also shown to include interconnect pipes 28A and 28B having threaded unions 30A and 30B, respectively, which allow the remotely located water distribution system's water inlet pipe 32 and water outlet pipe 34 to fluidly communicate with chamber 10, thereby providing a continuous source of water for "treatment" within chamber 10. As such, "untreated" natural water is delivered through inlet pipe 32 and interconnect pipe 28B to isolation chamber 10. Following the electronic "descaling" treatment, the "treated" water is discharged from isolation chamber 10 through interconnect pipe 28A and outlet pipe 34 for delivery to the inlet portion of the water distribution system. It should be appreciated that the particular size of the various interconnect pipes is largely dependent on the flow requirements of each particular applications, and thus their diameter and length can be modified as needed to better suit any given application.

In accordance with the present invention, water treatment system 8 is operational to "treat" the water by imparting an electrical signal or electromagnetic pulse via electrode assembly 20. Electrode assembly 20 includes an electrode rod 40 preferably made of a stainless steel rod having a threaded end 41. A stainless steel washer 42 is concentrically supported on threaded end 41, being held in place by silicon sealant 44 and epoxy cement applied to the threads of stainless steel rod 40. Washer 42 engages an elastomeric O-ring 46, the O-ring being sandwiched between stainless steel washer 42 and a non-metallic laminate washer 48. When assembled, the stack of washers 42, 46 and O-ring 48 is designed to provide a water-tight seal such that an electrode end cap 50 can be placed over electrode assembly 20 and threadably screwed onto pipe union 26. Once electrode end cap 50 is in place, thereby placing electrode 40 inside chamber 10, a small mica washer 52 is set in place over the external portion of threaded end 41 which projects through an operative (not shown) in end cap 50. Mica washer 52 then contacts a P.C. board washer 54, which is then tightened in place by a hex nut 56. Cable 14 has a threaded fitting 57 that is attached to the remaining portion of threaded end 41 of electrode rod 40, thereby providing an electrically conductive path which allows the electrical signal generated by the signal generation circuit to be regulated and continuously imparted to the water flowing with chamber pipe 22 via electrode rod 40.

With particular reference now to FIGS. 3A through 3D, the signal generation and error indication circuitry is shown to include a power supply circuit 60, a synchronizing circuit 62, a pulse train generation circuit 64, an error indication circuit 66, a display circuit 68 and an alarm circuit 70. While specific values for each of the various components used in the previously mentioned circuits are defined in the following description, it is to be understood that such values are merely exemplary in nature and are not intended to limit the scope of the present invention.

Figure 3A:
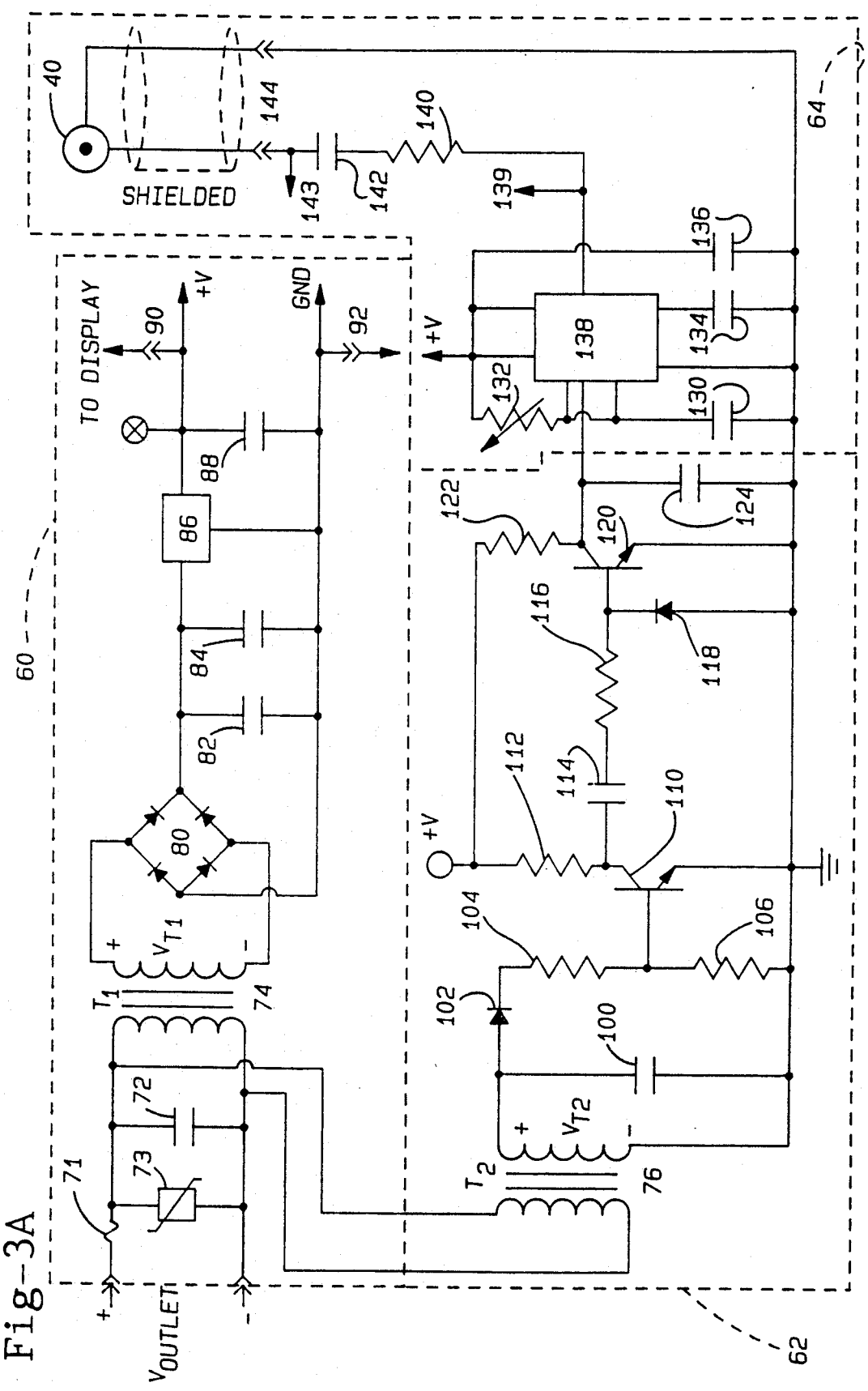
FIGS. 3A through 3D are circuit diagrams illustrating the signal generation circuit and the error indicating circuit incorporated into the controls of the present invention.

As shown in FIG. 3A, power supply circuit 60 is comprised of a fused connection 71 to a source of AC power, such as an outlet. Further circuit protection from high voltage transient spikes is provided by a metal oxide varistor (M.O.V.) 75. Next, a 0.01 μFd capacitor 72 is in parallel leading to a first transformer 74 and a second transformer 76. First transformer 74 steps down the input voltage from 110 Volts AC to 24 Volts AC, denoted as $V_{T1}$. Similarly, second transformer 76 steps down the 110 Volt AC to 6.3 Volt AC, denoted $V_{T2}$. The remainder of power supply circuit 60 is comprised of a rectification circuitry which includes a diode bridge 80 leading to a pair of capacitors in parallel, first capacitor 82 being 0.1 μFd and second capacitor 84 being a 470 μFd capacitor. Next, there is a three input power supply integrated circuit chip 86, commercially available as LM7815. Finally, a 0.1 μFd capacitor 88 is in parallel, leading to the connections 90, 92 that supply power to display circuitry 68.

As driven by second transformer 76, synchronization circuit 62 is comprised of a 0.1 μFd capacitor 100 in parallel with a diode 102 and a divided resistor network comprised of a 10KΩ resistor 104 and a 2.2KΩ resistor 106. The divided resistor network drives transistor 110, which is biased by a 4.7KΩ resistor 112. The collector of transistor 110 leads to a 1000 pFd capacitor 114 and 1.0KΩ resistor 116 tied to the base of transistor 120. Diode 118 is also tied to the base of transistor 120. A 10KΩ resistor 122 and 0.1 μFd capacitor 124 complete synchronization circuit 62.

Figure 4A:
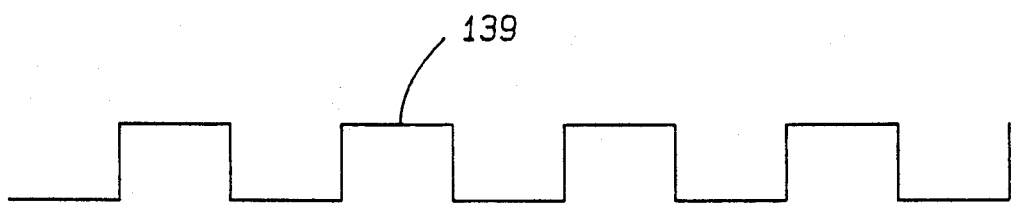
FIGS. 4A through 4C illustrate the wave-forms of the various generated signals.
Figure 4B:
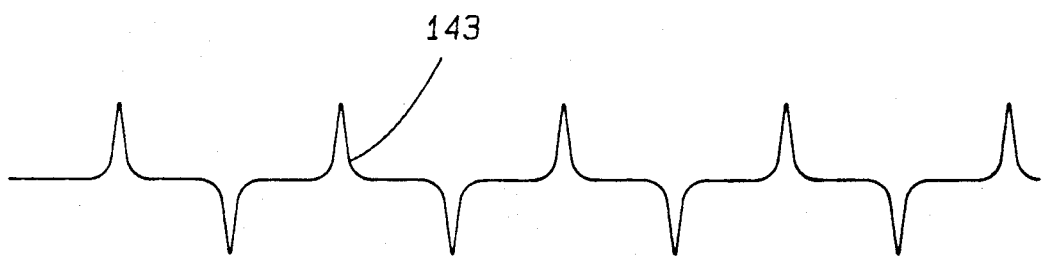

Pulse train generation circuit 64 includes a 0.1 μFd capacitor 130, a 20KΩ, 20 turn potentiometer 132, a 0.1 μFd capacitor 134 and another 0.1 μFd capacitor 136 which provide the calibration parameters for an integrated circuit timing chip 138, commercially available as LM555. When the signal leaves timing chip 138, its wave-form is in the shape of a square wave 139, as illustrated in FIG. 4A. Thereafter, square wave signal 139 is differentiated through 470KΩ resistor 140 and 0.47 μFd capacitor 142 to produce an alternating positive and negative pulse train 143, illustrated in FIG. 4B, having a peak to peak value of about 4.0 volts. This generated pulse train is then transmitted to electrode rod 40 through connector 144.

Figure 3B:
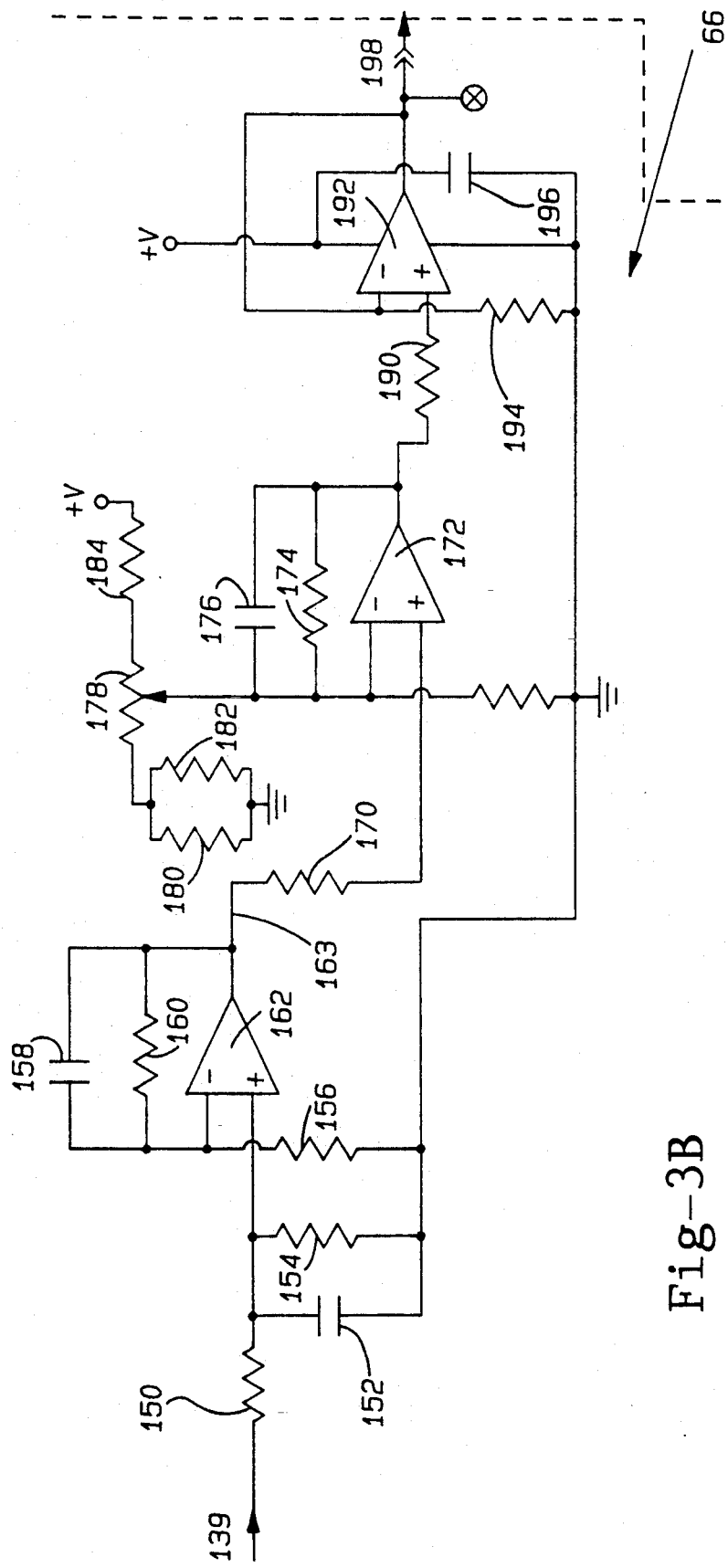
Figure 3C:
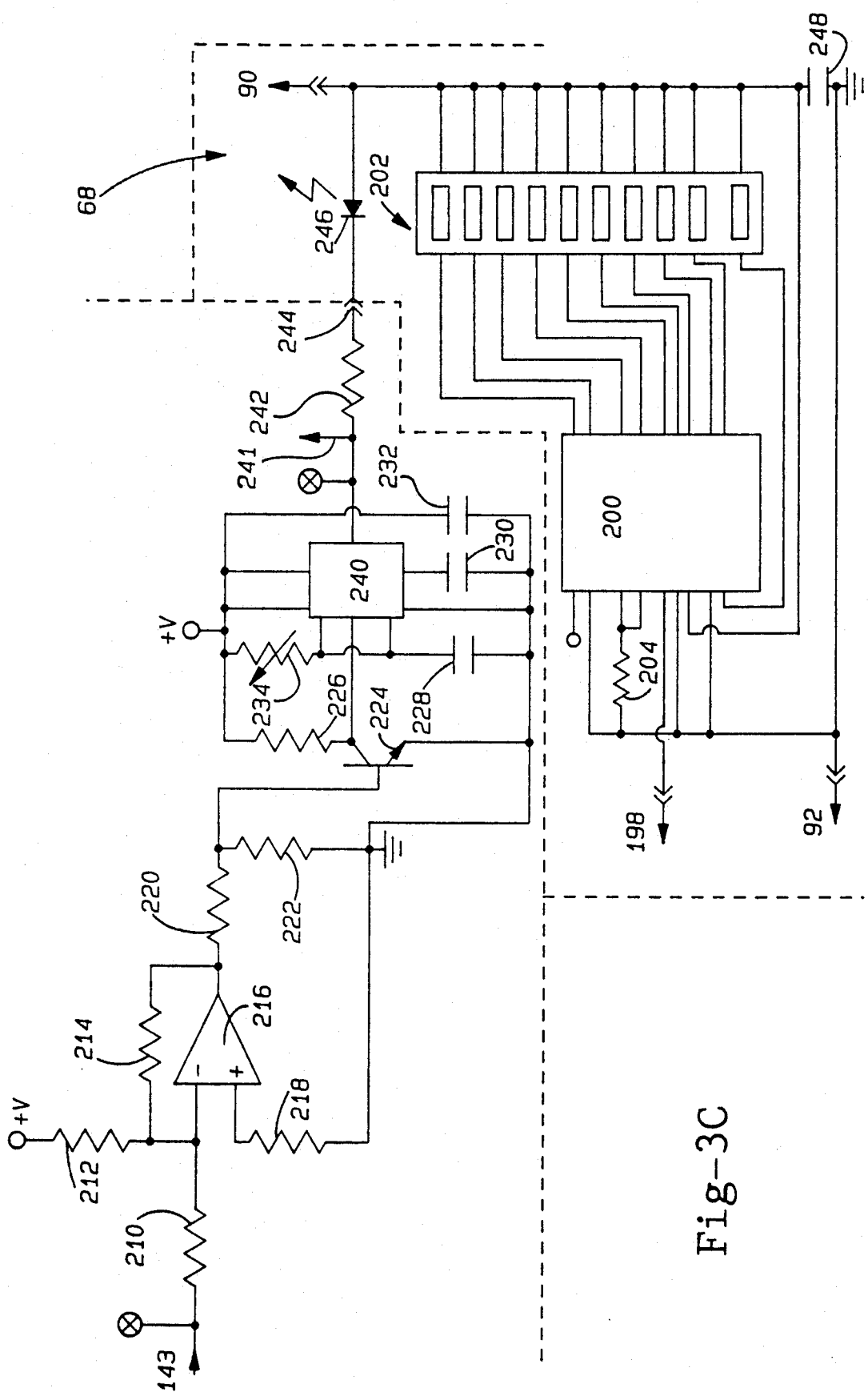
Figure 4C:

With reference to FIGS. 3B and 3C, error indication circuit 66 is operable to receive square wave signal 139 and alternating positive and negative pulse train signal 143 as its inputs. Square wave signal 139' is then processed through a series of op amp integrator circuits which eventually drive display circuit 68. More particularly, square wave signal 139 first encounters a 100KΩ resistor 150 in parallel with a 4.7 μFd capacitor 152 and 100KΩ resistor 154. The first integrator is comprised of a 100KΩ resistor 156, a 0.1 μFd capacitor 158 and a 10KΩ resistor 160 tied to the inverting input of a first op amp 162. The output of this first integrated stage is a saw-tooth wave 163, as illustrated in FIG. 4C. This saw tooth wave 163 is delivered to the second op amp integrator circuit, consisting of a 10KΩ resistor 170 tied to the non-inverting input of a second op amp 172, while the inverting input of op amp 172 is driven by a 100KΩ resistor 174 in parallel with a 4.7 μFd capacitor 176 leading to a 10KΩ, 20 turn potentiometer 178 in parallel with a pair of 1KΩ positive temperature coefficient resistors 180, 182 and a 100KΩ resistor 184. The inverting input of op amp 172 is also biased by a 200KΩ resistor 186. The last, or buffer, stage of error indication circuit 66 consists of a 10KΩ resistor 190 driving the non-inverting input of a third op amp 192, while the inverting input is biased by a 100KΩ resistor 194. The buffer stage also includes a 0.1 μFd capacitor 196.

The output of the buffer circuitry is operable to drive display circuit 68 (via connector 198), comprised of a dot/bar display driver 200 which, in turn, drives a ten segment bar graph display 202. The dot/bar display driver is commercially available as LM1508, and the bar graph display is commercially available as MV57164.

Pins No. 6 and 7 of dot/bar display driver 200 are biased by 1.5KΩ resistor 204 which provides bias for internal voltage reference and controls LED brightness. Bar graph display 202 presents a moving histogram-like read-out, where the peak point of the histogram corresponds with a peak pulse width approximately 0.5 milliseconds longer than the average pulse width, while the low point of the histogram corresponds with a pulse width approximately 0.5 milliseconds less than average. Potentiometer 178 is used to calibrate display circuit 68 such that the zero point pulse width is displayed by the display chip 202.

The alternating positive and negative pulse train signal 143 drives the other portion of error indication circuit 66. Specifically, the signal drives the inverting input of a fourth op amp 216 with the gain of op amp 216 determined by 30KΩ resistor 210 and 3MΩ resistors 212 and 214. The non-inverting input of op amp 216 is biased by 30KΩ resistor 218. This Schmidt trigger circuit, sensitive to the positive and negative pulses of pulse train signal 143, drives 30KΩ resistor 220 and 4.7KΩ resistor 222 leading to the base of transistor 224. Transistor 224, in combination with 4.7KΩ resistor 226, 0.1 μFd capacitors 228, 230 and 232, and 1MΩ, 20 turn potentiometer 234 bias a timer chip 240. The output of timer chip 240 is conditioned by 680Ω resistor 242 before it reaches display circuitry 68, and more particularly LED 246. The LED 246 will blink "off and on" in correspondence with the positive and negative alternating pulse train. In the event that the pulse train is not being generated properly, such as when there is either a short or a ground in the system, LED 246 will remain on continuously rather than blinking.

Figure 3D:
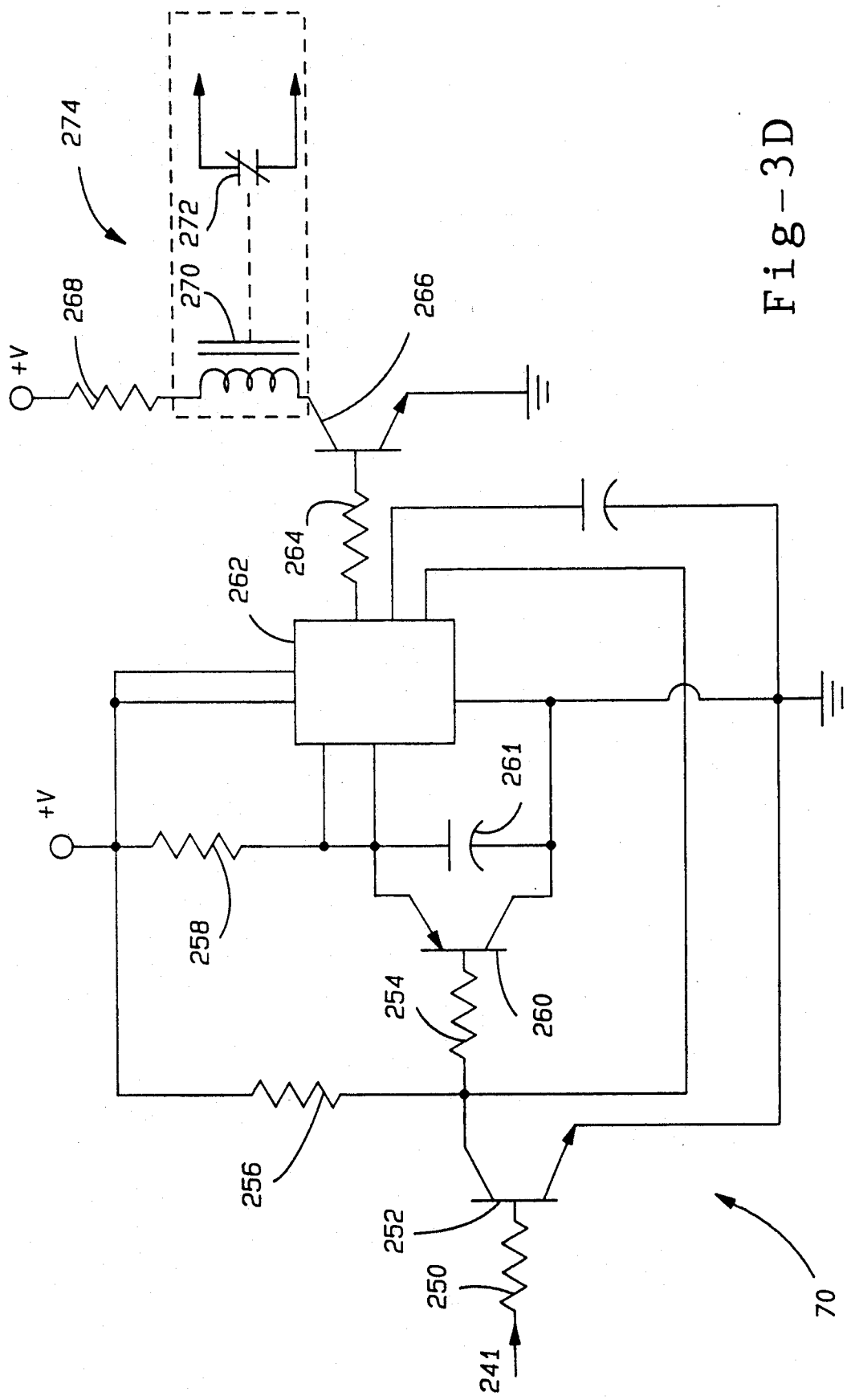

Referring now to FIG. 3D, the output signal 241 of timer chip 240 further drives an alarm circuit 70 operable to energize an audible alarm (not shown) in the event that the pulse train is not being generated properly. More particularly, the signal 241 drives the base of transistor 252 through 10KΩ resistor 250 causing the timer chip 262 to "trigger." When "triggered," the output of timer chip 262 is "high," positive voltage. This "high" output drives transistor 266 through 10KΩ resistor 264 energizing coil 270 of normally closed relay 274. When relay 274 is energized, the contacts are held in the open position, and the audible alarm will not sound.

When signal 241 drives transistor 252, a path to ground is further provided to the base of transistor 260 through 10KΩ resistor 254. This in turn allows current to flow through transistor 260 and causes capacitor 261 to discharge. It will be appreciated that when a signal is not present at the base of transistor 252, the path to ground through transistor 260 is not present and capacitor 261 is caused to charge through 2MΩ resistor 258. If a pulse does not arrive at the base of transistor 252 within a predetermined period of time, the voltage across capacitor 261 will exceed a threshold value. At that time, timer chip 262 is reset, causing the output to go "low," zero voltage. A "low" signal from timer circuit 262 will not drive transistor 266 thus de-energizing coil 270 of normally closed relay 274. In a de-energized state, contacts 272, of relay 274 close and the audible alarm sounds.

These circuits provide two methods of notification to maintenance personnel that the circuitry must be serviced. This is of significant importance to the proper function of the present invention since scale can build up rather quickly in the water distribution system when the pulse train is not being properly generated. Heretobefore, conventional systems relied on scheduled maintenance evaluations to determine the operational condition of the electronic water treatment system. Such evaluations are ineffective in quickly identifying and electrifying operational failures of the system. To make display circuitry 68 less susceptible to transient voltage signals, a 100 µFd capacitor 248 is placed in series with the power side of the display circuitry 68.

The foregoing description of a preferred embodiment has been provided for the purposes of illustration only, and it should be appreciated by those skilled in the art that modifications can be made without departing from the true spirit or fair scope of the present invention.

What is claimed is:

1. An apparatus for inhibiting buildup of scale in a fluid distribution system, said apparatus comprising:
   chamber means for isolating a portion of fluid from a fluid distribution system;
   signal generation means for generating an electrical signal, said electrical signal comprising an alternating positive and negative pulse train;
   electrode means for imparting said electrical signal to said isolated fluid, said electrode means being disposed within said chamber means such that said electrode means contacts said fluid, whereby said fluid imparted with said electrical signal is electrically charged such that scale is inhibited;
   error indicating means for generating a first indication whenever said electrical signal is imparted to said isolated fluid with a waveform, frequency and energy being within predetermined control limits and for generating a second indication whenever said electrical signal is otherwise imparted to said isolated fluid; and
   connection means in fluid communication with said chamber means for transporting said fluid into said chamber and for transporting said fluid from said chamber after it has been imparted with said electrical signal.

2. The apparatus of claim 1 wherein said signal generation means includes a power supply means for supplying power to said signal generation means, and pulse generation means for generating said electrical signal, wherein said pulse generating means comprises means for generating a square wave signal and means for differentiating said square wave signal thereby generating a pulse train having alternating positive and negative pulses.

3. The apparatus of claim 2 wherein said error indicating means comprises at least one LED display which is energized in a first condition corresponding to said first indication whenever said pulse train is within predetermined amplitude, magnitude and frequency limits, and is energized in a second condition corresponding to said second indication whenever said pulse train is not within said predetermined limits.

4. The apparatus of claim 3 wherein said error indicating means includes first display means for displaying a histogram-like representation of said pulse train, and second display means comprising a LED which is alternatingly energized on and off corresponding to said pulse train progressing from peak to trough to peak.

5. The apparatus of claim 4 wherein said error indicating means comprises said second display means energized in a constant on condition.

6. The apparatus of claim 4 wherein said error indicating means comprises means for energizing an audible alarm.

7. A method of inhibiting buildup of scale in a fluid distribution system, said method comprising the steps of:
   transporting untreated fluid to an isolation chamber;
   generating an electrical signal, said signal comprising an alternating positive and negative pulse train;
   imparting said electrical signal to said fluid confined within said isolation chamber;
   generating a first indication whenever said signal is imparted with a waveform, frequency and energy being within predetermined control limits and generating a second indication whenever said signal is otherwise imparted; and
   transporting treated fluid away from said isolation chamber, whereby said treated fluid is electrically charged for inhibiting the conglomeration of compounds suspended in said fluid so as to inhibit the buildup of scale within said fluid distribution system.

8. The method of claim 7 wherein said electrical signal is imparted to said isolated fluid via an electrode.

9. The method of claim 7 wherein said signal generation step includes:
   generating a square wave; and
   differentiating said square wave to produce said pulse train having alternating positive and negative pulses.

* * * * *